Patented Sept. 15, 1931

1,823,855

UNITED STATES PATENT OFFICE

PAUL A. DAVIS, OF AKRON, OHIO, ASSIGNOR TO THE GOODYEAR TIRE & RUBBER COMPANY, OF AKRON, OHIO, A CORPORATION OF OHIO

METHOD OF TREATING RUBBER COMPOUNDS

No Drawing. Application filed April 8, 1929. Serial No. 353,679.

This invention relates to methods of treating the surfaces of unvulcanized rubber and it has particular relation to a method of overcoming the tacky nature of the surfaces of that material and to an article formed thereby.

One object of the invention is to provide a method of treating surfaces of unvulcanized rubber whereby to render them non-adhesive at normal temperatures.

Another object of the invention is to provide a method of treating rubber surfaces which results in an increase of the adhesive nature of the rubber at high temperatures and more perfect unions between rubber surfaces or between rubber and fabric surfaces.

An additional object of the invention is to provide a method of treating rubber surfaces to obtain the above described results, which involves the use of a non-toxic, readily fusible dusting powder.

Uncured rubber, when subjected to the milling requisite to incorporation of the sulphur, pigments and other compounding ingredients employed in the vulcanization thereof, becomes relatively plastic and tacky in nature, and because of this property it tends to adhere to any object with which it comes in contact. In order to overcome this difficulty, it has heretofore been customary to dust the surfaces of the compounded material with a fine powdery material, such as talc, soapstone or potato starch to form a non-adhesive film thereon. These substances effectively prevented the adhesion of the uncured rubber to other bodies with which they came into contact. However, when the rubber was incorporated into articles and vulcanized, the powder being of relatively infusible nature, tended to create lines of cleavage between two contacting surfaces.

In order to obviate this difficulty, it has been proposed to substitute zinc stearate for the usual powdery substances. This compound has a point of fusion below that temperature which is ordinarily employed in vulcanizing rubber, and as a result the compound fuses during the process of curing the rubber and then flows and blends with the latter, thereby permitting the formation of a perfect union between the various surfaces.

This invention consists in the discovery that soaps of metals having atomic weights of from 24 to 27, such as magnesium and aluminum, may be substituted for the zinc stearate heretofore employed as a dusting powder for unvulcanized rubber. These soaps effectively prevent adhesion at normal temperatures. However, when the uncured rubber so coated or dusted is incorporated into rubber articles and is exposed to the heat of vulcanization, they readily fuse at comparatively low temperatures and then flow and blend with the rubber in substantially the same manner as the zinc compounds heretofore proposed. The soaps, when so blended, do not impair adhesion between the treated surfaces. In fact, in some cases it appears that adhesion is actually improved. This property is probably due to the fact that the compounds when fused act to some extent as plasticizers which enhance the tacky or adhesive properties of the rubber.

The oleates, stearates and palmitates of magnesium and aluminum are specific examples of compounds which may be employed in practicing the invention.

Substantially any convenient method may be employed in the preparation of the magnesium or aluminum soaps, although it has been found by practice to be convenient to reduce the fatty acid or fat to a soluble sodium soap and then to treat the soap with a soluble salt of aluminum or magnesium. Care should be taken to employ only theoretical quantities of the various ingredients. The final product should be filtered and dried at a temperature well below that of fusion of the reaction product in order to prevent the particles thereof from coalescing.

The compounds may be employed for dusting substantially any surfaces which it may be desirable to render non-adhesive while they are in an uncured state, but which it is desired should adhere to other surfaces during the process of vulcanizing. For example, they have been found particularly desirable for dusting the rubber tubing which is employed as a liner for ordinary hose. This material is stored as a coil or roll prior to its incorporation into the body of a hose, and because of the adhesive nature of the uncured compound the folds thereof if untreated tend to adhere to each other. Ordinarily, dusting powders cannot be employed on the surface of such tubing because they do not blend with the rubber during the course of vulcanization to permit the surface of the tubing to unite with the inner surface of the braid which is employed to wrap the tubing. When the new dusting powders are substituted for the powders heretofore used these difficulties are entirely obviated, as the new materials prevent adhesion between the tacky surfaces at ordinary temperatures, but by subjecting the hose to vulcanization they readily fuse with the main body of the rubber.

Furthermore, the compounds are non-toxic in character. Hence their use does not necessitate the employment of special ventilator systems and other precautions to prevent poisoning of the workmen that handle them.

Although I have described only the preferred embodiment of the invention, it will be apparent to those skilled in the art that it is not so limited, but that various modifications may be made therein without departing from the spirit of the invention or from the scope of the appended claims.

What I claim is:

1. A method of treating the surfaces of uncured rubber which comprises dusting them with a powder comprising a soap of a metal having an atomic weight between 24 and 27.

2. A method of treating the surfaces of uncured rubber in order to reduce the tacky character thereof which comprises dusting them with a soap of a metal selected from a group consisting of magnesium and aluminum.

3. A method of treating the surfaces of uncured rubber in order to reduce the tacky character thereof at ordinary temperatures which comprises dusting the surfaces with a soap of magnesium.

4. A method of reducing the adhesive character of unvulcanized rubber at ordinary temperatures which comprises dusting the surface thereof with a stearate of magnesium.

5. A method of promoting the union between surfaces of rubber during vulcanization, which comprises dusting the surfaces with a soap of a metal having a weight of 24 to 27.

6. A method of promoting the union between surfaces of rubber during vulcanization which comprises dusting the surfaces with a soap of a metal selected from a group consisting of magnesium and aluminum.

7. A method of promoting the union between surfaces of rubber during vulcanization which comprises dusting the surfaces with a soap of magnesium.

8. A method of treating rubber which comprises dusting the surface thereof with a soap of a metal selected from a group consisting of magnesium and aluminum, bringing the dusted surface into contact with the surface of another body, and subjecting the whole to vulcanization.

9. A method of treating rubber which comprises dusting the surface thereof with a soap of magnesium, bringing the dusted surface into contact with the surface of another body, and subjecting the whole to vulcanization.

In witness whereof, I have hereunto signed my name.

Signed at Akron, in the county of Summit and State of Ohio, U. S. A., this 6th day of April, 1929.

PAUL A. DAVIS.